W. R. LAMB.
COTTON ELEVATING AND DISTRIBUTING SYSTEM.
APPLICATION FILED JUNE 22, 1912.
1,087,882.
Patented Feb. 17, 1914.
3 SHEETS—SHEET 1.
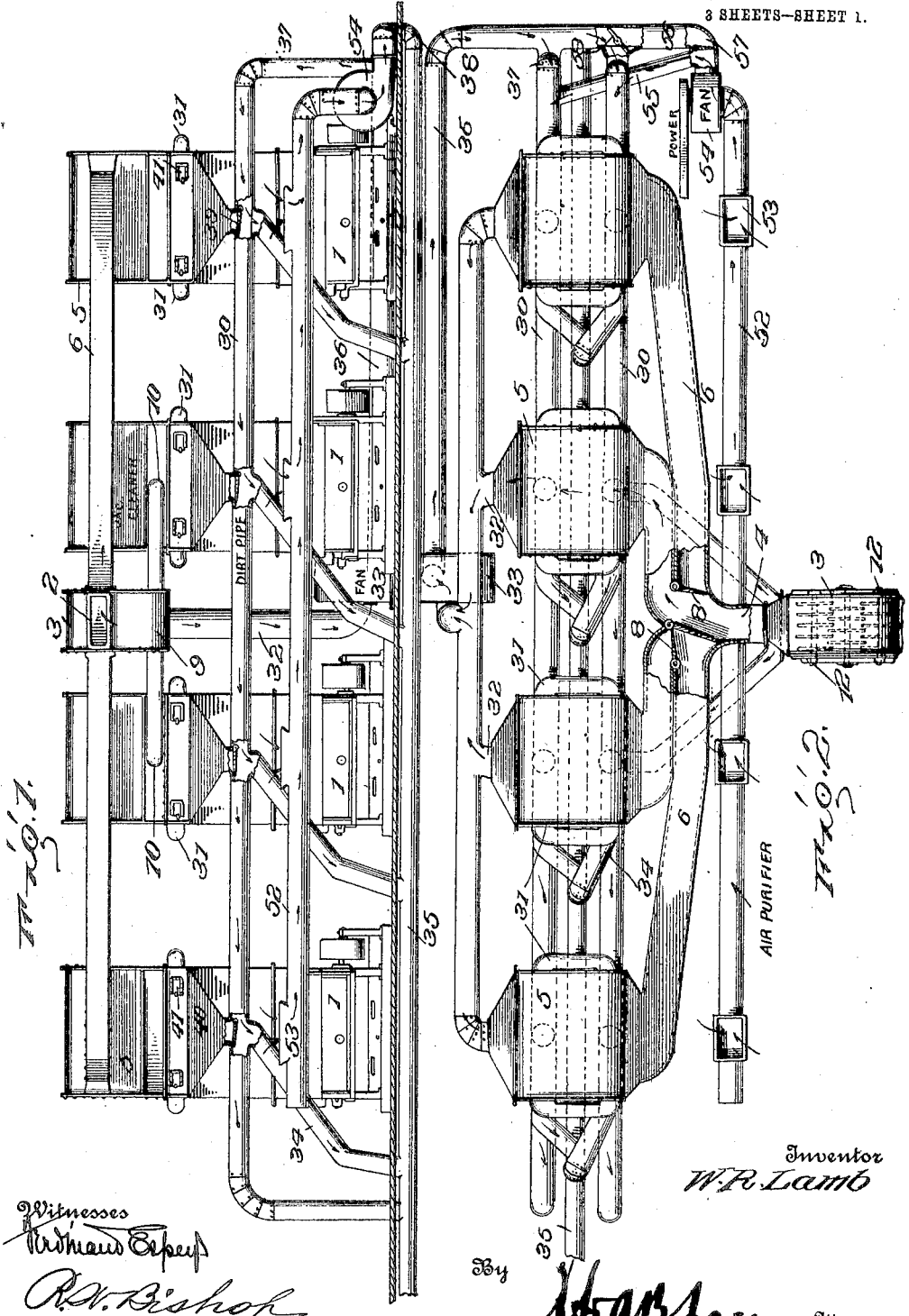

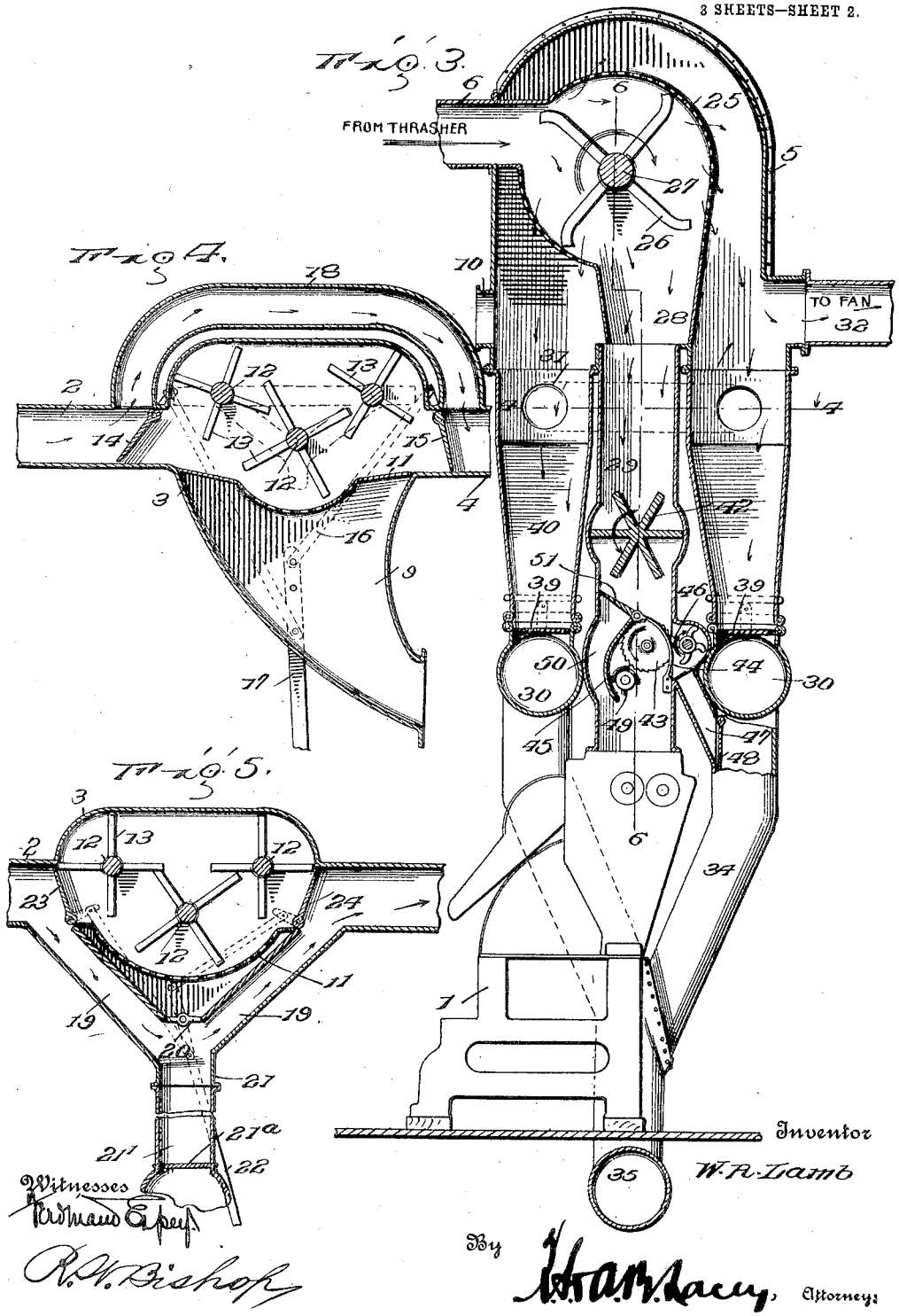

W. R. LAMB.
COTTON ELEVATING AND DISTRIBUTING SYSTEM.
APPLICATION FILED JUNE 22, 1912.
1,087,882.
Patented Feb. 17, 1914.
3 SHEETS—SHEET 3.
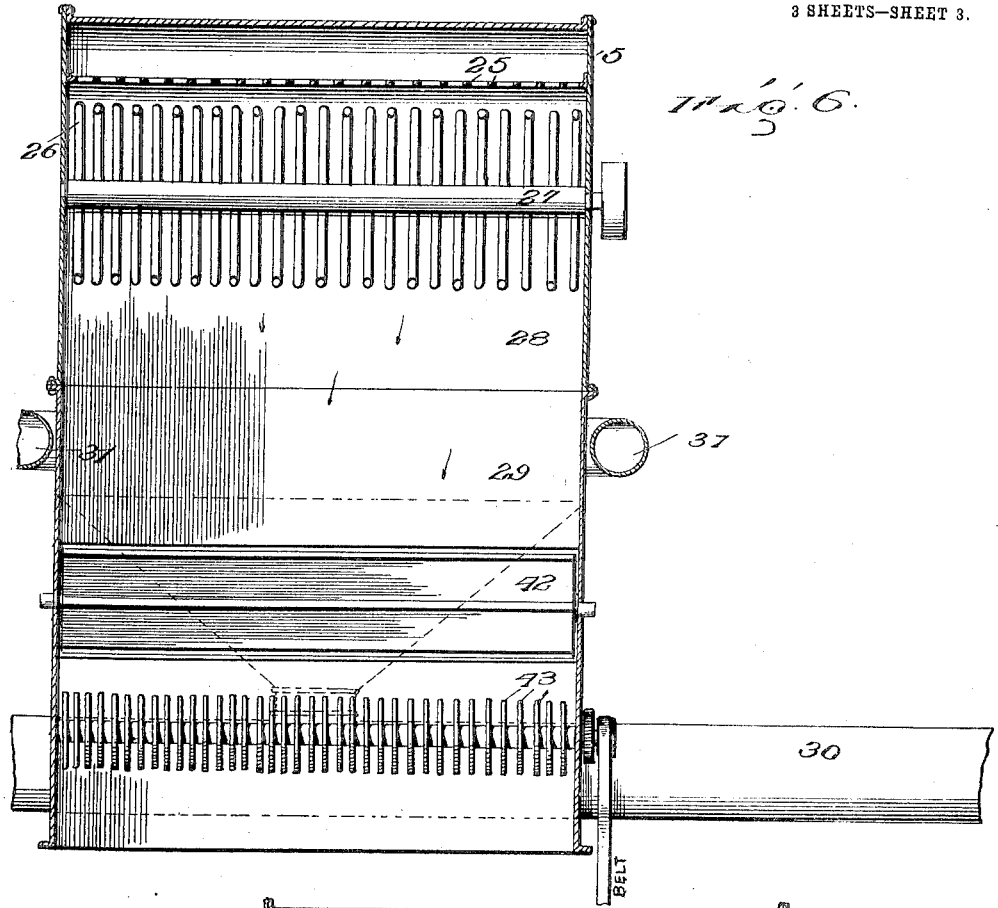
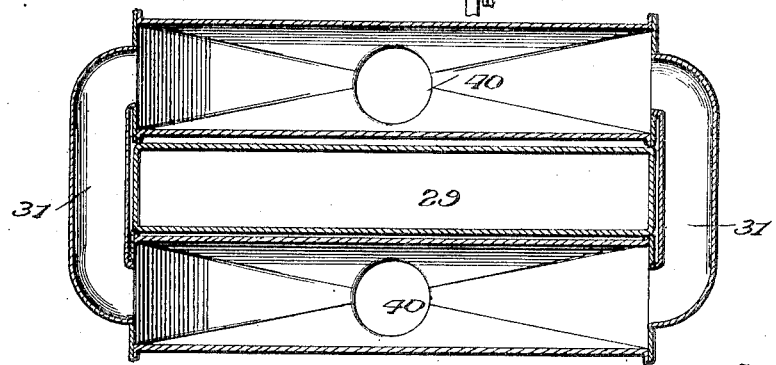

UNITED STATES PATENT OFFICE.

WILLIAM R. LAMB, OF DALLAS, TEXAS.

COTTON ELEVATING AND DISTRIBUTING SYSTEM.

1,087,882. Specification of Letters Patent. Patented Feb. 17, 1914.

Application filed June 22, 1912. Serial No. 705,341.

*To all whom it may concern:*

Be it known that I, WILLIAM R. LAMB, a citizen of the United States, residing at Dallas, in the county of Dallas and State of Texas, have invented certain new and useful Improvements in Cotton Elevating and Distributing Systems, of which the following is a specification.

This invention relates to mechanism for elevating and distributing cotton to cotton gins, and has for its object the provision of means whereby all dirt, grit, trash or other foreign matter will be separated from the seed cotton as it passes from the wagons or storage house to the receivers and feeders of the various cotton gins.

The invention includes means for threshing unopened cotton-bolls so that they will be broken and opened to permit the cotton contained therein, which would be otherwise lost, to be supplied to the gin.

The invention also contemplates the provision of means whereby the cotton may be caused to pass through this threshing mechanism or at will may be carried by the same without being subjected to the action thereof, so that, if so desired, the thresher may remain inactive.

The invention also comprises means for separating the burs from the seed-cotton before it reaches the gin feeders, so that the cotton will be cleaned before it reaches the gin and may be subjected to a second cleaning by the use of the gin feeders in the usual manner thereby producing a better grade of cotton than has been heretofore produced from the same quality of raw material.

The invention also has for its object the provision of means whereby the dirt and trash will be thoroughly and automatically separated from the seed-cotton and the burs and effectually discharged from the ginroom.

The invention seeks, generally, to improve the construction and arrangement of the parts of an elevating and distributing system to the end that the wear upon the gin saws and other operating parts of the ginning mechanisms will be decreased so that the serviceable condition of the gins will be prolonged and the cotton thoroughly cleaned before it reaches the gins.

The invention is fully illustrated in the accompanying drawings and will be hereinafter fully described, the novel features being subsequently pointed out more in detail in the claims following the description.

In the drawings: Figure 1 is an elevation of a battery of gin saws equipped with my improvements; Fig. 2 is a plan view of the same; Fig. 3 is an enlarged vertical section through the cotton beater and the bur extractor; Fig. 4 is a similar view through the thresher; Fig. 5 is a sectional view showing a modification; Fig. 6 is a sectional view taken on the line 6—6 of Fig. 3; Fig. 7 is a horizontal section taken on the line 7—7 of Fig. 3.

In the accompanying drawings is illustrated a battery of cotton gins 1 which, of course, may consist of any number of units or individual gins according to the demands of the locality where the cotton is ginned. The cotton is usually drawn from the wagon or from the store-house through pneumatic suction acting through a feed tube 2 which leads directly into the end of a casing 3 containing the thresher. The outlet tube 4 of this casing leads to the cotton cleaning and bur extracting mechanism which is indicated, generally, by the reference numeral 5 and is duplicated so that each gin will be under and receive the cotton directly from a cotton cleaning and bur extracting mechanism. The outlet tube is formed with a plurality of branches, indicated at 6, each leading to one of the cotton cleaning and bur extracting mechanisms, and valves 8 are provided at the junction of the tube 4 with the said several branches, so that, by adjusting the valves, the current of air through the thresher and the cotton discharged therefrom may be directed to any one gin or any desired set of gins. These valves are preferably gate valves mounted within the several conduits or tubes and adapted to swing across the ends of the same, so that any one branch may be opened or closed to the air current, and the material carried thereby, at will.

In the particular form illustrated, it will be noted there is a large intermediate valve which may be turned to either side of the outlet tube 4 to direct the cotton and the air current to all of the branches at one side of the system. It will also be readily understood that if this valve be arranged in an intermediate position the air current will be divided so that it will pass to both sides of the system. In the same manner the smaller valves may be adjusted to direct the air current into one of the gins at its side of the system or may divide the current so that part of it will pass to each of the gins at the respective side of the system.

The thresher casing is provided with a depending spout 9 which is intended to communicate with the casing of the cotton cleaning mechanism through a port 10 therein, as will be readily understood. This spout constitutes, generally speaking, a dirt box into which the foreign matter separated from the cotton by the thresher mechanism will be deposited and from the said spout it will be drawn through the port 10 into the casing of the cotton beating and bur extracting mechanism. Across the upper end of the spout or dirt box 9 is a partition 11 of some foraminous material so that dirt may readily pass into the spout 9 but the cotton will be prevented from following that course and will be carried through the proper channels to the gin.

The thresher mechanism comprises a plurality of shafts 12 which are journaled in the sides of the casing 3 and may be of any desired number, three being shown in the particular form illustrated. These shafts are arranged alternately above and below the line of passage of the cotton and the air current and are equipped with beater arms 13, as shown. As the unopened boll passes through the threshing mechanism, the beater arms are rotated in opposite directions so as to take up and act upon the material and effectually and positively break open the immature bolls so that the cotton contained therein will be separated therefrom and may be treated in the gins with the cotton from the fully ripened bolls.

At the inlet and discharge ends of the thresher, I provide valves 14 and 15 which may be turned so as to extend across the ends of the thresher casing and thereby prevent the current of air and the raw material passing through the thresher, as illustrated in Fig. 4. The valves are operated simultaneously by means of links 16, indicated in dotted lines in Fig. 4, and pivoted to a lever 17 at opposite sides of the fulcrum thereof so that when the lever is oscillated the valves will be simultaneously swung upon their pivots to permit or cut off the flow through the thresher casing.

A by-pass pipe 18 is extended around the thresher casing and opens into the tubes leading to and from the same, so that, when the valves 14 and 15 are adjusted as shown in Fig. 4, the air current, with the material carried thereby, will be prevented from passing through the thresher but will be carried around the same so that it will be fed to the gins without having been subjected to the action of the beater arms 13. When it is necessary or desirable to have the cotton pass through the thresher, the valves 14 and 15 will be swung across the ends of the by-pass 18, as will be readily understood. In Fig. 4, the by-pass 18 is shown as extending above the thresher casing but it may extend below the same, and in Fig. 5, I have illustrated such an arrangement. In this form the foraminous or perforated partition 11 is employed as before, together with the same arrangement of shafts 12 and beater arms 13 thereon. The dirt box, however, is not in direct communication with the thresher chamber but is supported therefrom by the downwardly converging tubes or branch pipes 19 constituting the by-pass. A valve 20 is provided in the top of the bypass which constitutes the bottom of the thresher chamber, the valve being located at the lowest point of said bottom. The pivot of this valve is the fulcrum of the operating lever 22, so that, as the said lever is vibrated, the valve will be turned to close the bottom of the threshing chamber or to permit flow therefrom. A collar or ring 21 is formed on the under side of the by-pass and the dirt box 21' depends from said ring or collar and is provided at its lower end with a valve 21$^a$ held normally closed by a spring or the force of the air blast. When the cotton is flowing through the by-pass, this valve will remain closed and the cotton cannot pass through the same and be lost. When the thresher is operating, the dirt will accumulate in the dirt box until its weight overcomes the force of the blast or the tension of the spring when the valve will open and the dirt will pass directly into the dirt discharging pipe. Valves 23 and 24 are provided at the inlet and discharge ends of the thresher casing, respectively, and are operated by the lever 22 in the same manner as valves 14 and 15 are operated by the lever 17 with the exception that the valves 23 and 24 are pivotally mounted at their lower ends instead of their upper ends.

As before stated, the dirt box 9 discharges through a port 10 in the side of the casing for the cotton cleaning and bur extracting mechanism and the outlet from the thresher leads into the upper end of said casing, opening directly into an inner foraminous casing 25 which is preferably of slotted material. This casing 25 is spaced from the outer casing 5 and is substantially cylindrical in its upper portion so as to fit close to the beater arms 26 carried by a beater shaft 27 which is journaled in the sides of the casing 5, as will be readily understood, the said beater arms having their ends turned rearwardly with respect to the direction of rotation so that they will readily clear the cotton in which they operate. The cotton passes into the chamber defined by the casing 25 and is thoroughly agitated by the beater so that the dirt remaining therein will be loosened and will be drawn through the perforations of the casing by the suction through the apparatus. The cotton then passes downwardly from the said casing through the outlet spout 28 of the same into a tubular conductor 29 on its way to the gin, while the dirt and dust extracted from the cotton will pass into the space between the outer casing 5 and the inner casing 25 and gravitate through the same to the dirt pipes 30.

Just below the port 10, vacuum or dead air tubes 31 are provided on the sides of the casing and constitute external connections between the branches of the same, as shown clearly in Figs. 3 and 7, the tube or pipe 32 leading to the fan 33 being connected with the casing 5 above the said tubes 31 and substantially in line with the port 10. It will be readily understood that the suction created by the fan will draw the dirt and dust from the cotton and will also draw the dirt deposited in the dirt box 9 into the casing 5 above the tubes 31, and the said tubes will serve to divert the air currents so that they will pass through the said tubes to the fan and tube 32, thereby creating a partial vacuum or dead air space below the tubes which will accelerate the descent of the particles of dirt to the dirt pipes. The said dirt pipes 30 extend the full length of the battery of gins at the opposite sides thereof and lead to any convenient point of deposit. They are also provided with branches 34 which merge into a common discharge tube 35 disposed below the floor of the gin-room and extending outside the building or to any other convenient point of deposit.

A blast tube 36 leads from the fan 33 around the end of the battery of gins and has vertical branches 37 extending to and merging into the dirt pipes 30 so that the fan will create a suction through the thresher or huller and the cotton beater or cleaner and also create a blast through the dirt pipes so as to positively drive from the latter the dust and dirt deposited therein. The blast tube or pipe 36 also has a downturned branch 38 which leads into the lower discharge pipe 35 so that the waste products which tend to collect in the said pipe 35 will be blown therefrom.

A valve 39 is provided in the upper side of the dirt pipe 30, immediately over the branch 34 leading downwardly therefrom, and this valve will be normally held up in its closed position by the force of the suction above and the blast through the dirt pipe. As the dirt accumulates on the said valve, it will eventually overcome the force of the blast so that the valve will open and the matter collected therein will be discharged through the branch 34 into the main discharge pipe 35, as will be readily understood. The fine particles of dust which may sift past the valve will consequently be constantly blown out, while the heavier particles will be prevented from accumulating in the said pipes to fill and choke the same.

It will be readily understood from the drawings and the foregoing description that the casing 5 consists essentially of two tubular columns or pipes, indicated at 40, which are connected by the dead air tubes 31, and in the sides of the said columns 40 windows or inspection openings 41 may be provided so that the interior of the casing may be examined at any time and the progress of the operation noted. Between the columns 40 is the tubular conductor 29 which leads into the gin feeder, and at an intermediate point of the said conductor tube 29, I provide the rotary valve 42 which will constantly rotate when the apparatus is in use and will prevent the formation of back currents which would interfere with the passage of the cotton to the gin. Below the said rotary valve and extending across the conductor tube 29 is a gang of saws 43, the teeth of which will take into the cotton and separate the burs and loose hulls therefrom. Guards or ribs 44 are secured to the side of the conductor tube below the saws and extend upwardly between the same to a partition 45 in rear thereof, so that, while the cotton and seed may pass between the saws, the hulls and burs will be prevented from passing.

To effectually remove the burs and hulls from the cotton, a rotary picker 46 is provided in front of and immediately adjacent the saws, the arms or teeth of said picker working in the spaces between the saws and close to the guard ribs 44, so that the hulls and burs will be extracted and deposited in a spout or tube 47 which opens into one of the branches 34 of the dirt pipes, a valve 48 being provided across the lower end of the said spout or tube 47 to permit the burs and hulls to pass from the said tube into the dirt pipes but prevent flow in the opposite direction. Adjacent the lower portion of the partition 45 and arranged to act upon the teeth of the saws 43 is a gang of brushes 49 which, by rotating against the saw teeth, will effectually sweep therefrom all particles of cotton which tend to cling thereto so that all of the cotton will be fed into the gin and none of it will be lost, while the saws will be maintained in a clean condition so that they will properly perform their functions at all times.

The space 50 between the partition 45 and the side of the conductor tube 29 constitutes a by-pass through which the cotton may flow to the gin when it is not necessary to submit it to the action of the saws and the bur extractor, and a valve 51 is provided at the upper end of the partition and so arranged that it may be turned across the end of the by-pass 50 to direct the flow to the saws and the bur extractor or may be extended over the saws and the extractor so that the flow will be diverted into the by-pass.

As there is always some lint and dirt flying about the gin-room, which tends to affect the health of the operatives, I utilize the dirt pipes 35 as a means for carrying off this matter, and to that end I provide a collector and ventilator tube 52 which may extend around or through the gin-room in any desired manner and is provided in its upper side with inlets 53, as shown. This collector tube 52 has one end leading into the casing of a fan 54, the outlet of which communicates through a pipe 55 with one of the dirt pipes. The supplemental fan 54 consequently creates a suction through the ventilating and dirt collecting pipe 52 and also drives a blast through the dirt discharging pipes 30 or 35 and to that extent relieves the strain upon the main fan 33 so that the power exerted by said fan may be utilized principally for drawing the cotton pneumatically through the apparatus.

By referring to Fig. 2, it will be noted that the pipe 36, leading from the main fan, is formed with an extension 56 which leads to the discharge of the supplemental fan. A valve 57 is provided at the junction of this extension with the pipe 55 and a valve 58 is provided at the junction of the extension with that dirt pipe 30 which is not in communication with the pipe 55. Obviously, the valves 57 and 58 prevent the discharge from the main fan passing into the outlet from the supplemental fan and they may be adjusted so as to direct the blast from the supplemental fan into either of the dirt discharging pipes. By this arrangement, when the gins are not operating and the main fan, therefore, not running, the supplemental fan may be utilized to clean out the dirt discharging pipes successively.

From the foregoing description, taken in connection with the accompanying drawings, it will be seen that I have provided a mechanism by which the unopened bolls of cotton may be drawn from the wagon or storage room and delivered to the gin feeders the bolls being opened and the cotton threshed on its way to the feeders. The cotton, which has been heretofore lost through failure of the bolls to open properly, is saved and the particular arrangement and disposition of the thresher and the beater insures the thorough breaking up of the bolls prior to their delivery to the bur extractor. Where the proportion of unopened bolls is very slight, the valves may be adjusted so that the cotton will pass around the thresher and consequently be more rapidly fed to the gin and the expense of operation thereby somewhat reduced, as will be readily understood. This adjustment of the apparatus will be found desirable at times where the raw material is in such condition that very little treatment is needed for bringing it into commercial form, or where a cheaper grade of product is intended to be furnished. It will also be advantageous where the cotton is comparatively clean and nearly ready for treatment in the gin as it is delivered to the gin-house. The apparatus effectually separates the burs from the seed-cotton before the cotton reaches the gin feeders and consequently a higher grade of cotton is produced, inasmuch as it is twice cleaned in the process of treatment, the first cleaning being effected before the cotton reaches the gin feeders and the second cleaning being effected in the gin feeders. While the valves 39 are closed, the suction from the main fan is cut off below the vacuum tubes 31 and a partial vacuum is formed below the said tubes through which the dirt will fall by gravity and the wear upon the fan blades is thereby minimized, an under current passing below said valves being utilized to carry off the waste products. As the ends of the dead air tubes are spaced apart below the slotted material, the air current is spread and passes through the material in all directions instead of merely flowing in one stream through the length of the casing as heretofore so that a more thorough cleaning of the cotton is effected.

The screen is preferably slotted metal having openings two inches long and five thirty-seconds of an inch wide as these dimensions are found to give the most satisfactory results in removing large particles of leaf from the cotton and permitting said particles to pass out with the air.

The dust collecting and ventilating pipe may be located anywhere in the gin building but it is preferably arranged just over the breasts of the gins in front of the gin feeders.

My device is simple in the construction of its parts and compactly arranged and will be found highly efficient for the purposes for which it is intended.

While the improvements have been shown applied to gins which are fed pneumatically, it will be understood, of course, that it may be applied to gins which are fed by a belt and that other minor changes may be made in the details of construction and arrangement without departing from the spirit or scope of the invention as the same is defined in the following claims.

What I claim is:—

1. In an apparatus for the purpose set forth, the combination of a pneumatic conveyer tube, a dirt box pendent from and communicating with said tube, a thresher mechanism disposed immediately over the dirt box, a by-pass communicating with the conveyer tube, means for creating a partial vacuum below the dirt box and leading around the thresher mechanism, means for cutting off the by-pass or the thresher, and means for creating a partial vacuum below the dirt box.

2. In an apparatus for the purpose set forth, the combination of an outer casing, a foraminous casing within the said outer casing and spaced therefrom, dirt pipes leading from the said outer casing, a conductor tube leading from said foraminous casing, a vacuum tube disposed externally to the outer casing and communicating therewith, a suction tube leading from the outer casing above the said vacuum tube, and means for creating a draft through the casings and said suction tube.

3. In an apparatus for the purpose set forth, the combination of a beater and cleaner casing having spaced discharge tubes, dirt pipes leading from said tubes, a fan arranged to create a suction through the casing, a blast tube leading from the said fan to the dirt tubes to create a blast through the same, and means within the casing for agitating the cotton.

4. The combination with a battery of gins, of a plurality of cotton cleaners and beaters located upon and leading into the respective gins, conveyer tubes leading into the said cleaners, a thresher mechanism having an outlet common to all of said conveyer tubes, means for creating a suction through the said cotton cleaners and the thresher mechanism and means for directing the material flowing from the thresher into any one or more of said conveyer tubes.

5. In an apparatus for the purpose set forth, the combination of a battery of gins, a plurality of dirt pipes leading past the gins, a plurality of cotton cleaners disposed over the respective gins and having dirt outlets leading into the said dirt pipes and having a communication with the respective gins, a thresher mechanism common to all of said cleaners, and a fan disposed to create a suction through the said thresher mechanism and the cleaners and a blast through the dirt pipes.

6. In an apparatus for the purpose set forth, the combination of cotton cleaning mechanism, dirt pipes leading from said mechanism, a dust collecting pipe, a fan for creating a suction through the cotton cleaning mechanism and a blast through the dirt pipes, a fan for creating a suction through the dust collecting pipe, and a discharge leading from the latter fan into the dirt pipes.

7. In an apparatus for the purpose set forth, the combination of a pneumatic conveyer tube, a by-pass interposed in the said tube between the inlet and outlet ends thereof, a thresher mechanism arranged between the ends of the by-pass, a dirt box on the underside of the said tube to receive waste products from the thresher mechanism, a beater casing having a port communicating with the lower end of the dirt box, a foraminous casing within the first-mentioned casing communicating with the pneumatic conveyer tube, a beater within said foraminous casing, an outlet from said foraminous casing leading into a gin, a suction tube leading laterally from the outer beater casing, a vacuum tube communicating with the vacuum casing and disposed externally thereto below the suction tube, and discharge tubes leading from the said casing below the said vacuum tube.

8. The combination with a battery of gins, of a plurality of cotton cleaners and beaters located upon and leading into the respective gins, conveyer tubes leading into the said cleaners, a thresher mechanism having an outlet common to all of said conveyer tubes, means for creating a suction through the said cotton cleaners and the thresher mechanism, and a plurality of valves arranged adjacent the said outlet to close one or more of said tubes.

9. In an apparatus for the purpose set forth, the combination of cotton cleaning mechanism, dirt pipes leading from said mechanism, a dust collecting pipe, a fan for creating a suction through the cotton cleaning mechanism and a blast through the dirt pipes, a fan for creating a suction through the dust collecting pipe, a discharge leading from the latter fan into the dirt pipes, and means for directing the flow from said discharge into either dirt pipe.

10. The combination of a gin, a cotton cleaning mechanism arranged over the same, dirt pipes leading from said mechanism, and means for creating a suction through said mechanism and an under current blast through the dirt pipes.

11. The combination of a gin, a cotton cleaning mechanism arranged over the gin, dirt pipes leading past the gin from said cleaning mechanism, a dirt pipe passing below the gin, branches leading from the first-mentioned dirt pipes to the lower dirt pipe, valves controlling the flow from the cleaning mechanism to the dirt pipes, and means for creating a suction through the cleaning mechanism above said valves and a blast through the dirt pipes below said valves.

12. The combination with a gin of a cleaning mechanism located above the same, dirt pipes leading from said mechanism, means for creating a suction through the cleaning mechanism, and means for creating dead air spaces in the dirt pipes.

13. The combination with a gin of a cleaning mechanism located above the same, means for creating a suction through the cleaning mechanism, and means for creating dead air spaces between the cleaning mechanism and the gin.

14. The combination of a casing, a plurality of beaters therein, a foraminous casing fitting close to the beaters, a discharge for the cleaned cotton from the said beaters, a discharge for the dirt from the casing, means for creating a suction through the beaters, means for creating an under current through the dirt discharges, and means for forming a dead-air space in the upper portion of the dirt discharges.

15. The combination of an outer casing, a foraminous casing within the same and spaced therefrom, spaced dirt-discharging spouts leading from the outer casing, an outlet from the inner casing, a dead-air tube connecting the dirt-discharging spouts exteriorly, and means for causing a circulation of air through the foraminous casing.

16. The combination of an outer casing, a foraminous casing within the same and spaced therefrom at all sides, beaters within said inner casing, an outlet for cleaned material at one end of the inner casing, dirt-discharging spouts on the outer casing at opposite sides of the said outlet, means for drawing air through the inner casing, and a dead-air tube connecting said spouts whereby the air will form an under current through and below the inner casing.

17. In an apparatus for the purpose set forth, the combination of an outer casing, an inner foraminous casing spaced therefrom, a cleaner within the foraminous casing, a cotton-conveying tube leading from the foraminous casing, dirt spouts leading from the outer casing, and dead air tubes opening into the dirt spouts and connecting them laterally.

In testimony whereof I affix my signature in presence of two witnesses.

WILLIAM R. LAMB. [L. S.]

Witnesses:
J. D. YOAKLEY,
SAMUEL N. ACKER.